UNITED STATES PATENT OFFICE.

EUGENE C. SULLIVAN AND WILLIAM C. TAYLOR, OF CORNING, NEW YORK, ASSIGNORS TO THE CORNING GLASS WORKS, OF CORNING, NEW YORK, A CORPORATION OF NEW YORK.

GLASS COMPOSITION AND ARTICLES MADE THEREFROM.

1,369,988.      Specification of Letters Patent.      Patented Mar. 1, 1921.

No Drawing.      Application filed May 3, 1919. Serial No. 294,528.

*To all whom it may concern:*

Be it known that we, EUGENE C. SULLIVAN and WILLIAM C. TAYLOR, both citizens of the United States of America, and residents of city of Corning, county of Steuben, and State of New York, have invented certain new and useful Improvements in Glass Composition and Articles Made Therefrom, of which the following is a specification.

Among the well known glasses are the silica alkali glasses, containing one or more of the bivalent oxids (lime, zinc, etc.) in order to give them a certain amount of stability. Lime, which is in common use for the purpose indicated, has a tendency to increase the hardness of the glass, so that the lime glass heretofore in use has been harder than is permissible for certain purposes, such for instance as the manufacture of bulbs for incandescent electric lamps. As far as known to us, it was at the time of our invention, the common practice in making incandescent electric lamp bulbs to use lead glasses, as only by the use of such glasses could a co-efficient of expansion be obtained approximately that of platinum (viz., .0000091) which is used for the leading-in wires. Among the properties desirable in such a glass are that it be not too hard to prevent proper working within the furnace, that it have the proper viscosity within the range of the temperatures in which it can be worked in its fabrication, and that it be stable to resist disintegration, both under corrosive influences and under long and repeated heatings. With many glasses the latter result in devitrification. If an attempt be made to reduce the hardness of the ordinary lime glass by the addition of alkali, its co-efficient of expansion is increased beyond limits permissible for the purpose indicated. The problem is thus presented, in using lime or alkaline earth oxids, of obtaining stability by the addition of such oxid and at the same time obtaining a sufficiently soft glass without the addition of so much alkali as will unduly increase the expansivity of the glass. We have discovered that magnesia is better suited to accomplish this result than is lime, magnesia glasses having lower co-efficients of expansion than lime glasses of equal softness, and that by the use either of magnesia as the sole bivalent oxid, or as one of a number of bivalent oxids, when combined with other bivalent oxids in proper proportions, we are enabled to obtain satisfactory expansivity, stability, softness and viscosity. We have discovered that the quantities most efficient in producing softness are of lime and magnesia in equal molecular proportions, although satisfactory results may be obtained with a glass not containing any lime. On the other hand, as the molecular proportion of lime is increased over that of magnesia the glass rapidly increases in hardness, the rise in hardness for magnesia in excess of lime being much slower. While, therefore, to produce minimum hardness it may be desirable to use the magnesia and lime in the theoretical proportion stated, it is obvious that a departure therefrom is possible, if the composition is otherwise varied, as by increasing the alkali contents, whereby an increase in hardness, due to the departure from such equal proportions, may be counteracted. This increase in alkali results in an increase in expansivity, and in this connection it is proper to note that our investigations indicate that the expansion co-efficient factor of magnesia in a magnesia-lime glass is higher than the generally accepted expansivity factor for magnesia.

From the above it will be seen that our invention may be embodied in various glass compositions in which the ratio of magnesia to lime is varied and in which the proportions of other ingredients are also varied in accordance with the end sought.

For purposes of specific illustration the following percentage compositions of glasses falling within the scope of this invention are given, composition I being that of a glass disclosed in our prior application, Sr.

No. 151,002, filed Feb. 26, 1917 (this case forming a continuation in part thereof as to such composition):

Percentage composition.

|         | I    | II   | III  | IV   | V    | VI   | VII  | VIII | IX   |
|---------|------|------|------|------|------|------|------|------|------|
| $SiO_2$ | 68.9 | 79.4 | 79   | 72   | 63   | 74.5 | 70.7 | 62   | 72.5 |
| $Na_2O$ | 20.3 | 16.8 | 17.2 | 19   | 22   | 20.2 | 20.7 | 22   | 22   |
| MgO     | 5.6  | 1.6  | 1.6  | 3.7  | 6.2  | 2.6  | 8.6  | 15   | 2.6  |
| CaO     | 5.2  | 2.2  | 2.2  | 5.3  | 8.8  | 2.7  |      |      |      |
| ZnO     |      |      |      |      |      |      |      |      | 3.1  |

Molecular formula.

|         | I    | II   | III | IV   | V    | VI   | VII  | VIII | IX   |
|---------|------|------|-----|------|------|------|------|------|------|
| $SiO_2$ | 100  | 100  | 100 | 100  | 100  | 100  | 100  | 100  | 100  |
| $Na_2O$ | 28.5 | 20.5 | 21  | 25.5 | 33.8 | 26.3 | 28.4 | 36   | 29.4 |
| MgO     | 12.1 | 3    | 3   | 7.7  | 14.7 | 5.22 | 18.2 | 36.2 | 5.4  |
| CaO     | 8.1  | 3    | 3   | 7.9  | 15   | 3.89 |      |      |      |
| ZnO     |      |      |     |      |      |      |      |      | 3.2  |

In considering the above molecular formula attention is directed to the further fact that with silica present in the molecular proportion of 100;

1. The univalent oxid (alkali) varies from 20 to 36.

2. That the bivalent oxid contents (magnesia in compositions VII and VIII, magnesia and lime in compositions I, II, III, IV, and V and magnesia and zinc oxid in composition IX) varies from 6 to 37.

It will be further noted that the molecular ratio of magnesia to other bivalent oxids may vary from infinity, as in formulas VII and VIII, to 98 to 1, as in composition V, and in percentage the magnesia constitutes over 40 per cent of the total bivalent contents in all the compositions.

As illustrating the results obtained by our invention, it may be noted that the hardness of the glass of composition I above given is 670° and its linear expansivity is .0000108; the hardness of the glass of composition II is 694° and its expansivity is .0000087; the hardness of the glass of composition III is 680° and its expansivity is .0000089; the hardness of the glass of composition VII is 682° and its expansivity is .0000102; and the hardness of the glass of composition VIII is 664° and its expansivity is .0000110.

Hardness of a given degree meaning that a thread of the glass 1 mm. in diameter and 23 cm. in length suspended vertically and heated to the temperature of the degree stated through its upper 9 cm. elongates of its own weight at the rate of 1mm. per minute.

As a further specific example of the desirable results flowing from this invention attention is directed to the fact that the glass of composition I has good stability. Thus when cane of this glass is placed in distilled water in a sealed tube and subjected to the temperature of steam at 90 pounds pressure for 3 hours the amount of alkali dissolved from the glass is only .002 mg. of $Na_2O$ per sq. cm. of glass exposed. It has a relative viscosity of 9 whereas that of equimolecular lime glass is about 150, relative viscosity being relative weight of load in grams necessary at 620° C. to cause a flow of 1 mm. per minute in a cane of 1 mm. diameter.

The above general properties of our glass render it especially desirable as a material from which to blow incandescent lamp bulbs, it being satisfactorily free from a tendency to crystallization in work and of frosting in the flame, and the glass has been primarily designed with that object in view. It is obvious that our invention will not be avoided by slight variations in proportions, unless such exact proportions are demanded in terms by the claims hereunto appended; or by the addition of small and immaterial quantities of ingredients other than those specified herein. For instance, acidic constituents such as boric oxid or alumina may be present in quantities not exceeding 5 per cent. of the total mixture, and likewise in special cases the bivalent oxid, lime, may be replaced by another bivalent oxid such as zinc, as is indicated by composition IX.

It should be noted that the alkali preferably used is sodium, as potash tends to increase the hardness of the glass beyond workable limits.

Heretofore, to our knowledge, magnesia has only been intentionally introduced in those glasses which also contain substantial quantities of boric or phosphoric acids, although lime used in glass making usually contains as impurity some magnesia. We believe, however, that we are the first to discover the beneficial result of magnesia when used without lime, or with limited proportions of lime, shown in the above formula.

In another application filed by us under date of December 16, 1920, Serial No. 431,311, as a continuation in part hereof, we make claims specific to the glass of composition VI of this application and directed to glasses containing aluminia and hence by failure to make such claims in this application, do not abandon the same.

Having thus described our invention, what we claim and desire to secure by Letters Patent is,—

1. A glass containing silica, soda, and two bivalent oxids in the molecular proportions of 100 of silica to at least 20 of alkali, to at least 6 of bivalent oxids.

2. A glass containing silica, soda, and the bivalent oxids of lime and magnesia in the molecular proportions of 100 silica to at least 20 of soda, to at least 6 of the bivalent oxids.

3. A glass containing silica, soda and bivalent oxids, in the molecular proportions of 100 of silica to at least 20 of soda, to at least 6 of the bivalent oxids.

4. A glass containing magnesia and having a linear expansion not greater than .000011, and a hardness less than 694° C.

5. A glass substantially free from boric and phosphoric oxids and containing magnesia and lime in the molecular ratio of that of more than 1 to 1.

6. A glass in which the molecular ratios fall within the following limits: silica 100; bivalent oxid content 15 to 36; univalent oxid content 25 to 37, and in which the molecular ratio of univalent oxid contents to bivalent oxid contents is that of more than 1 to 1.

7. A glass containing at least one of the common alkaline earths in which the molecular ratios fall within the following limits: silica 100; alkali oxid 25 to 37; bivalent oxid 15 to 36, and in which the molecular ratio of alkali oxid to alkaline earth oxid is that of more than 1 to 1.

8. A silica glass substantially free from phosphoric oxid and containing at least 4% magnesia (MgO), and not more than 5% of acidic constituents other than $SiO_2$.

9. A silicate glass containing magnesia and at least one other bivalent oxid and having at least 18% of sodium oxid.

10. A silicate glass containing from 5% to 15% MgO, and over 18% of sodium oxid.

11. A glass containing magnesia and lime and at least 18% of sodium oxid.

12. A glass substantially free from boric and phosphoric oxids, in which the magnesia is a chief bivalent element.

13. As a new article of manufacture, an electric lamp inclosure made of a magnesia-lime glass whose coefficient of linear expansion is not greater than .000011.

14. As a new article of manufacture, an electric lamp inclosure made from magnesia-lime glass in which the magnesia is present in greater molecular ratio than the lime.

15. A glass containing silica, soda, and at least one of the bivalent alkaline earth oxids, in which the molecular ratios fall within the following limits; silica 100, alkali oxid 20 to 36, and bivalent oxid content 6 to 36.

16. A glass containing silica, soda, and two bivalent oxids in which the molecular ratios fall within the following limits; silica 100; alkali oxid 20 to 36, and bivalent oxid content 6 to 36.

17. A glass containing silica, soda and bivalent oxids of lime and magnesia in which the molecular ratios fall within the following limits; silica 100; alkali oxid 20 to 36, and bivalent oxid content 6 to 36.

18. A glass containing magnesia and having a linear expansion of .0000087 to .000011, and a hardness of between 664° C. and 694° C.

19. A glass substantially free from boric and phosphoric oxids and containing magnesia and lime in the molecular ratio of that of not less than 1 to 1.

20. A glass containing magnesia and substantially free from boric and phosphoric oxids, the molecular ratio of the magnesia to the total bivalent oxid content being at least 1 to 1.

21. As a new article of manufacture, an electric lamp inclosure made from magnesia-lime glass in which magnesia is present in at least the same molecular ratio as the lime.

22. A glass containing silica, soda, lime and magnesia, in which the magnesia is at least 40% of the combined magnesia and lime contents, and in which the molecular ratios fall within the following limits; silica 100, soda 20 to 37, bivalent oxids of lime and magnesia 6 to 30.

23. A glass containing silica and magsia, in which the magnesia is at least 40% of the bivalent oxid contents, and in which the molecular ratios fall within the following limits; silica 100, soda 20 to 37, and bivalent oxids 6 to 30.

In testimony whereof, we hereunto sign our names this 30th day of April, 1919.

EUGENE C. SULLIVAN.
WILLIAM C. TAYLOR.